United States Patent
Henze et al.

(10) Patent No.: US 9,610,567 B2
(45) Date of Patent: Apr. 4, 2017

(54) PROCESS FOR REGENERATING A CATALYST COMPRISING RUTHENIUM OXIDE FOR THE OXIDATION OF HYDROGEN CHLORIDE

(75) Inventors: Guido Henze, Buerstadt (DE); Heiko Urtel, Bobenheim-Roxheim (DE); Martin Sesing, Waldsee (DE); Martin Karches, Neustadt (DE); Thorsten Von Fehren, Buerstadt (DE); Toni Kustura, Carlsberg (DE)

(73) Assignee: BASF SE, Ludwigshafen (DE)

( * ) Notice: Subject to any disclaimer, the term of this patent is extended or adjusted under 35 U.S.C. 154(b) by 1024 days.

(21) Appl. No.: 13/142,786

(22) PCT Filed: Dec. 28, 2009

(86) PCT No.: PCT/EP2009/067938
§ 371 (c)(1),
(2), (4) Date: Jun. 29, 2011

(87) PCT Pub. No.: WO2010/076296
PCT Pub. Date: Jul. 8, 2010

(65) Prior Publication Data
US 2011/0274613 A1 Nov. 10, 2011

(30) Foreign Application Priority Data
Dec. 30, 2008 (EP) .................................. 08173097

(51) Int. Cl.
| | | |
|---|---|---|
| C01B 7/04 | (2006.01) |
| B01J 38/44 | (2006.01) |
| B01J 23/46 | (2006.01) |
| B01J 23/96 | (2006.01) |
| B01J 38/30 | (2006.01) |
| B01J 21/04 | (2006.01) |
| B01J 21/06 | (2006.01) |
| B01J 21/08 | (2006.01) |
| B01J 35/02 | (2006.01) |

(52) U.S. Cl.
CPC ............ *B01J 23/462* (2013.01); *B01J 23/96* (2013.01); *B01J 38/30* (2013.01); *B01J 38/44* (2013.01); *C01B 7/04* (2013.01); *B01J 21/04* (2013.01); *B01J 21/06* (2013.01); *B01J 21/063* (2013.01); *B01J 21/08* (2013.01); *B01J 35/023* (2013.01); *Y02P 20/584* (2015.11)

(58) Field of Classification Search
CPC .. B01J 38/12; B01J 38/42; B01J 38/44; C01B 7/04
USPC ................................... 423/502, 507
See application file for complete search history.

(56) References Cited

U.S. PATENT DOCUMENTS

| 4,851,380 A | * | 7/1989 | Van Leirsburg et al. | 502/37 |
| 6,197,275 B1 | | 3/2001 | Hagemeyer et al. | |
| 8,318,125 B2 | * | 11/2012 | Uchida et al. | 423/502 |
| 2008/0247941 A1 | * | 10/2008 | Schubert et al. | 423/502 |
| 2008/0269515 A1 | * | 10/2008 | Haas et al. | 560/341 |
| 2009/0239736 A1 | * | 9/2009 | Schmidt et al. | 502/37 |
| 2010/0028248 A1 | * | 2/2010 | Mori et al. | 423/507 |

FOREIGN PATENT DOCUMENTS

| DE | 196 34 192 | | 2/1998 |
| EP | 0 761 593 | | 3/1997 |
| JP | 2007 007521 | | 1/2007 |
| JP | 2008063175 A | * | 3/2008 |

OTHER PUBLICATIONS

New Riverside University Dictionary, p. 1206, 1984.*
U.S. Appl. No. 13/146,487, filed Jul. 27, 2011, Linsenbuehler, et al.
International Search Report issued Jun. 4, 2010 in PCT/EP09/067938 filed Dec. 28, 2009.
U.S. Appl. No. 13/142,915, filed Jun. 30, 2011, Henze, et al.
U.S. Appl. No. 13/142,462, filed Jun. 28, 2011, Henze, et al.
U.S. Appl. No. 13/377,232, filed Dec. 9, 2011, Henze, et al.
Daniela Crihan, "HCl-Oxidation AuF $RuO_2$(110): Neuartiger Deacon-Prozess", Justus-Liebig-Universität Giessen: Dissertation Nov. 2007, XP 002582656, May 13, 2008, pp. II-159. (with English Abstract).

* cited by examiner

*Primary Examiner* — Ngoc-Yen Nguyen
(74) *Attorney, Agent, or Firm* — Oblon, McClelland, Maier & Neustadt, L.L.P.

(57) ABSTRACT

The invention relates to a process for regenerating a hydrogen chloride oxidation catalyst comprising ruthenium oxide on a support material, which comprises the steps
a) reduction of the catalyst in a gas stream comprising hydrogen chloride and optionally an inert gas at a temperature of from 100 to 800° C.,
b) recalcination of the catalyst in an oxygen-comprising gas stream at a temperature of from 150 to 800° C.

8 Claims, No Drawings

PROCESS FOR REGENERATING A CATALYST COMPRISING RUTHENIUM OXIDE FOR THE OXIDATION OF HYDROGEN CHLORIDE

The invention relates to a process for regenerating a catalyst comprising ruthenium oxide for the oxidation of hydrogen chloride and a process for the oxidation of hydrogen chloride comprising regeneration of the catalyst.

In the process for the catalytic oxidation of hydrogen chloride developed by Deacon in 1868, hydrogen chloride is oxidized to chlorine by means of oxygen in an exothermic equilibrium reaction. The conversion of hydrogen chloride into chlorine enables chlorine production to be decoupled from the production of sodium hydroxide by chloralkali electrolysis. Such decoupling is attractive since the world demand for chlorine is growing faster than the demand for sodium hydroxide. In addition, hydrogen chloride is obtained in large amounts as coproduct, for example in phosgenation reactions, for instance in isocyanate production.

A catalyst which is frequently used for the oxidation of hydrogen chloride comprises ruthenium oxide $RuO_2$ on an inert support material. Customary inert support materials are oxides of aluminum, silicon and titanium, for example alpha-$Al_2O_3$. The activity of this catalyst depends on the size of the $RuO_2$ particles on the support. The smaller the particles, the more active the catalyst because of the larger specific surface area of the active component. With increasing time under reaction conditions, the catalyst undergoes aging, which can be attributed to, inter alia, the growth of the $RuO_2$ crystallites. This growth results from the migration of the $RuO_2$ particles on the surface of the catalyst support. Above a particular crystallite size, the catalyst has become deactivated to such an extent that it can no longer bring about the desired conversion even when the temperature is increased.

JP-A 2007-7521 describes a process for reactivating a hydrogen chloride oxidation catalyst comprising ruthenium oxide, in which the deactivated catalyst is brought into contact at from 200 to 400° C. with oxygen or an inert gas which has no oxidizing or reducing properties and has neither acidic nor basic properties. Inert gases mentioned are steam, nitrogen, argon and helium. In an example, a catalyst comprising ruthenium oxide on a mixture of aluminum oxide and titanium dioxide is treated with pure oxygen at a temperature of about 280° C. to effect reactivation. In a further example, the catalyst is treated with nitrogen at about 280° C. to effect reactivation.

It is an object of the invention to provide a simple process for regenerating an at least partially deactivated hydrogen chloride oxidation catalyst comprising ruthenium oxide on a support material. The process should preferably be able to be carried out in the hydrogen chloride oxidation reactor itself.

This object is achieved by a process for regenerating a hydrogen chloride oxidation catalyst comprising ruthenium oxide on a support material, which comprises the steps
a) reduction of the catalyst in a gas stream comprising hydrogen chloride and optionally an inert gas at a temperature of from 100 to 800° C., preferably from 300 to 500° C.,
b) recalcination of the catalyst in an oxygen-comprising gas stream at a temperature of from 150 to 800° C., preferably from 200 to 450° C.

It has been found that $RuO_2$ can be reduced by means of hydrogen chloride. It is assumed that the reduction proceeds via $RuCl_3$ to elemental ruthenium. Thus, if a partially deactivated catalyst comprising ruthenium oxide is treated with hydrogen chloride, ruthenium oxide is presumably reduced quantitatively to ruthenium after a sufficiently long treatment time. This reduction destroys the $RuO_2$ crystallites and redisperses the ruthenium, which can be present as elemental ruthenium, as a mixture of ruthenium chloride and elemental ruthenium or as ruthenium chloride, on the support. After the reduction, the ruthenium can be reoxidized by means of an oxygen-comprising gas, for example by means of air, to the catalytically active $RuO_2$. It has been found that the catalyst obtained in this way again has approximately the activity of the fresh catalyst. An advantage of the process is that the catalyst can be regenerated in situ in the reactor and does not have to be removed from the reactor.

In the catalytic process, also known as the Deacon process, hydrogen chloride is oxidized to chlorine by means of oxygen in an exothermic equilibrium reaction, with water vapor being formed. Customary reaction temperatures are in the range from 150 to 500° C., and customary reaction pressures are in the range from 1 to 25 bar. Oxygen is usually employed in superstoichiometric amounts. For example, a two- to four-fold excess of oxygen is customary. Since no decreases in selectivity have to be feared, it can be economically advantageous to work at relatively high pressures and accordingly residence times which are longer than at atmospheric pressure.

The catalyst which has been regenerated by the process of the invention comprises ruthenium oxide on silicon dioxide, aluminum oxide, titanium dioxide or zirconium dioxide as support. Preferred supports are silicon dioxide, aluminum oxide and titanium dioxide, with particular preference being given to aluminum oxide and titanium dioxide.

A very particularly preferred support is alpha-aluminum oxide.

Suitable catalysts can be obtained, for example, by application of ruthenium chloride to the support and subsequent drying or drying and calcination. Suitable catalysts can additionally comprise compounds of other noble methods, for example gold, palladium, platinum, osmium, iridium, silver, copper or rhenium.

Customary reaction apparatuses in which the catalytic oxidation of hydrogen chloride is carried out are a fixed-bed or fluidized-bed reactor. The oxidation of hydrogen chloride can be carried out in a plurality of stages.

The catalytic oxidation of hydrogen chloride can be carried out adiabatically or preferably isothermally or approximately isothermally, batchwise, preferably continuously, as a moving-bed or fixed-bed process. It is preferably carried out in a fluidized-bed reactor at a temperature of from 320 to 400° C. and a pressure of from 2 to 8 bar.

In the isothermal or approximately isothermal mode of operation, it is also possible to use a plurality of, i.e. from 2 to 10, preferably from 2 to 6, particularly preferably from 2 to 5, in particular 2 or 3, reactors connected in series with additional intermediate cooling. The oxygen can either all be added together with the hydrogen chloride upstream of the first reactor or its addition can be distributed over the various reactors. This series arrangement of individual reactors can also be combined in a single apparatus.

In one embodiment, a structured catalyst bed in which the catalyst activity increases in the flow direction is used in a fixed-bed reactor. Such structuring of the catalyst bed can be achieved by different impregnation of the catalyst support with active composition or by different dilution of the catalyst with an inert material. Inert materials which can be used are, for example, rings, cylinders or spheres of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Suitable shaped catalyst bodies are any shapes, with preference being given to pellets, rings, cylinders, stars, wagon wheels or spheres, particularly preferably rings, cylinders or star extrudates.

The catalyst can also be used as fluidized-bed catalyst in the form of powder having an average particle size of from 10 to 200 microns. The catalyst is preferably used as fluidized-bed catalyst.

The supported ruthenium catalysts can be obtained, for example, by impregnation of the support material with aqueous solutions of $RuCl_3$ and, if appropriate, a promoter for doping, preferably in the form of its chlorides. Shaping of the catalyst can be carried out after or preferably before impregnation of the support material.

Suitable promoters for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The support material can, after impregnation and doping, be dried and if appropriate calcined at temperatures of from 100 to 500° C., preferably from 100 to 400° C., for example under a nitrogen, argon or air atmosphere. It is preferably firstly dried at from 100 to 200° C. and subsequently calcined at from 200 to 400° C.

The volume ratio of hydrogen chloride to oxygen at the reactor inlet is generally in the range from 1:1 to 20:1, preferably from 2:1 to 8:1, particularly preferably from 2:1 to 5:1.

The regeneration of the catalyst comprising ruthenium oxide is generally carried out when the activity of the catalyst has dropped to below 50%, preferably to below 30%, of the original activity.

In a first step a), the catalyst is reduced by means of a gas stream comprising hydrogen chloride and optionally an inert gas at a temperature of from 100 to 800° C., preferably from 300 to 500° C., particularly preferably from 330 to 450° C. and in particular from 380 to 430° C. The gas stream comprising hydrogen chloride can additionally comprise inert gases such as nitrogen or argon or further noble gases. In general, the gas stream comprises from at least 10 to 100% by volume, preferably from 50 to 100% by volume of hydrogen chloride. The gas throughput is generally from 0.1 to 1 kg, preferably from 0,3 to 1 kg of gas per kg of catalyst. The treatment time is, for example, from 1 to 36 hours. The treatment pressure is in general from 1 to 5 bar.

In a step b), the catalyst is recalcined at a temperature of from 100 to 800° C., preferably from 200 to 450° C., particularly preferably from 330 to 400° C., in an oxygen-comprising gas stream. The oxygen content of the gas stream is generally from 1 to 100% by volume, preferably from 1 to 30% by volume, particularly preferably from 10 to 30% by volume. The gas stream can comprise inert gases such as nitrogen or argon or further noble gases, preferably nitrogen, in addition to oxygen. The gas throughput is generally from 0.1 to 1 kg, preferably from 0,3 to 1 kg of gas per kg of catalyst. The treatment time is, for example, from 10 to 120 minutes.

The invention also provides a process for the catalytic oxidation of hydrogen chloride, which comprises the steps
i) introduction of a stream comprising hydrogen chloride and an oxygen-comprising stream into an oxidation reactor comprising a hydrogen chloride oxidation catalyst comprising ruthenium oxide on a support material and oxidation of hydrogen chloride to chlorine over the catalyst until the catalyst has a reduced activity,
ii) regeneration of the catalyst,
iii) continuation of the oxidation of hydrogen chloride to chlorine according to step i) over the regenerated catalyst obtained in step ii).

The regeneration step ii) can be repeated after renewed deactivation. In principle, the regeneration according to the invention can be carried out as often as desired.

Steps i) to iii), i.e. oxidation of hydrogen chloride and catalyst regeneration, can be carried out in one and the same reactor. An advantage of the invention is that the catalyst does not have to be removed from the reactor and transferred to another reactor for the regeneration.

The invention is illustrated by the following examples.

EXAMPLES

Example 1

585 g of a used catalyst ($RuO_2$ on $\alpha$-$Al_2O_3$) are operated at 400° C. using 195 standard $l \cdot h^{-1}$ of HCl and 97.5 standard $l \cdot h^{-1}$ of $O_2$ in a fluidized-bed reactor having a diameter of 44 mm, a height of 990 mm and a bed height of from 300 to 350 mm. The catalyst is in the form of a powder having an average diameter of 50 microns ($d_{50}$). A hydrogen chloride conversion of 61% is obtained. The oxygen is then switched off for 24 hours at 400° C. and 292.5 standard $l \cdot h^{-1}$ of HCl is instead passed over the catalyst. After 24 hours, operation is changed back to the original conditions and an HCl conversion of only 4% is obtained. Changing the gases over to 60 standard $l \cdot h^{-1}$ of $O_2$ and 240 standard $l \cdot h^{-1}$ of $N_2$ and recalcination for a period of 30 minutes at 400° C. reactivates the catalyst. After this treatment, the catalyst displays a conversion of HCl of 83% using 195 standard $l \cdot h^{-1}$ of HCl and 97.5 standard $l \cdot h^{-1}$ of $O_2$ at 400° C.

Example 2

21 kg of a used catalyst ($RuO_2$ on $\alpha$-$Al_2O_3$) are operated at 400° C. using 10.5 $kg \cdot h^{-1}$ of HCl, 4.6 $kg \cdot h^{-1}$ of $O_2$ and 0.9 $kg \cdot h^{-1}$ of $N_2$ in a fluidized-bed reactor having a diameter of 108 mm, a height of from 4 to 4.5 m and a bed height of from 2.5 to 3 m. The catalyst is in the form of a powder having an average diameter of 50 microns ($d_{50}$). A HCl conversion of 77% is obtained. The oxygen is then switched off for 20 hours at 400° C. and 10.0 $kg \cdot h^{-1}$ of HCl is instead passed over the catalyst. After 20 hours, the catalyst is recalcined at 400° C. for 30 minutes under 2.0 $kg \cdot h^{-1}$ of $O_2$ and 8.0 $kg \cdot h^{-1}$ of $N_2$ and thus reactivated. After this treatment, the catalyst displays a conversion of HCl of 84% using 10.5 $kg \cdot h^{-1}$ of HCl, 4.6 $kg \cdot h^{-1}$ of $O_2$ and 0.9 $kg \cdot h^{-1}$ of $N_2$ at 400° C.

Example 3

1% by Weight of $RuO_2$ on $\alpha$-$Al_2O_3$ 100 g of $\alpha$-$Al_2O_3$ (powder, d=50 μm) are impregnated with 36 ml of an aqueous ruthenium chloride solution (2.1% based on ruthenium) in a rotating glass flask. The moist solid is dried at 120° C. for 16 hours. The resulting dry solid is calcined in air at 380° C. for 2 hours.

Example 4

2% by Weight of $RuO_2$ on $\alpha$-$Al_2O_3$ 100 g of $\alpha$-$Al_2O_3$ (powder, d=50 μm) are impregnated with 36 ml of an aqueous ruthenium chloride solution (4.2% based on ruthenium) in a rotating glass flask. The moist solid is dried at 120° C. for 16 hours. The resulting dry solid is calcined in air at 380° C. for 2 hours.

Example 5

5% by Weight of $RuO_2$ on $\alpha$-$Al_2O_3$ 100 g of $\alpha$-$Al_2O_3$ (powder, d=50 μm) are impregnated with 36 ml of an aqueous ruthenium chloride solution (10.5% based on ruthenium) in a rotating glass flask. The moist solid is dried at 120° C. for 16 hours. The resulting dry solid is calcined in air at 380° C. for 2 hours.

Example 6

2% by weight of $RuO_2$ on $\gamma$-$Al_2O_3$:

100 g of $\gamma$-$Al_2O_3$ (powder, d=50 μm) are impregnated with 80 ml of an aqueous ruthenium chloride solution (1.9% based on ruthenium) in a rotating glass flask. The moist solid is dried at 120° C. for 16 hours. The resulting dry solid is calcined in air at 380° C. for 2 hours.

Example 7

2% by Weight of $RuO_2$ on $TiO_2$ (Rutile):

100 g of $TiO_2$ (rutile, powder, d=33 μm) are impregnated with 73 ml of an aqueous ruthenium chloride solution (2.1% based on ruthenium) in a rotating glass flask. The moist solid is dried at 120° C. for 16 hours. The resulting dry solid is calcined in air at 380° C. for 2 hours.

Example 8

2% by Weight of $RuO_2$ on $SiO_2$:

100 g of $SiO_2$ (powder, d=60 μm) are impregnated with 90 ml of an aqueous ruthenium chloride solution (1.7% based on ruthenium) in a rotating glass flask. The moist solid is dried at 120° C. for 16 hours. The resulting dry solid is calcined in air at 380° C. for 2 hours.

Examples 9 to 15

Testing of the Fresh Catalysts:

2 g in each case of the catalysts from examples 3-8 are mixed with 118 g of the corresponding support material as inert material and 9.0 standard l/h of HCl and 4.5 standard l/h of $O_2$ are passed through them from the bottom via a glass frit at 360° C. in a fluidized-bed reactor (d=29 mm; height of the fluidized bed: 20-25 cm).

The HCL conversion is determined by passing the resulting gas stream into a potassium iodide solution and subsequently titrating the iodine formed with a sodium thiosulfate solution. The HCl conversion achieved using the catalyst from example 1 comprising 1% by weight of $RuO_2$ on $\alpha$-$Al_2O_3$ is 19.0% and is assigned an activity of 1.0 for comparative purposes. If a catalyst contains more than the 1.0% by weight of $RuO_2$ of the comparative catalyst, the activity is normalized to an $RuO_2$ content of 1.0% by weight.

Artificial Aging and Testing:

20 g of the fresh catalysts are artificially aged at 450° C. in air for 12 hours in a muffle furnace. The aged catalysts obtained in this way are examined to determine the activity in the same way as described above.

Regeneration in a Fixed Bed:

6.5 ml of the aged catalysts are treated with 3 standard l/h of HCl at 400° C. in a fixed bed (l=25 cm; d=6 mm) for 24 hours and subsequently calcined at 360° C. under an air atmosphere for 1 hour. The regenerated catalyst obtained in this way is examined to determine the activity in the manner described above.

The results are summarized in table 1:

TABLE 1

| $RuO_2$ [% by weight] | Support | Activity of the fresh catalyst [—] | Activity of the aged catalyst [—] | Activity of the regenerated catalyst [—] |
|---|---|---|---|---|
| 1 | $\alpha$-$Al_2O_3$ | 1.00 | 0.46 | 0.72 |
| 2 | $\alpha$-$Al_2O_3$ | 1.95 | 0.24 | 1.13 |
| 5 | $\alpha$-$Al_2O_3$ | 1.79 | 0.30 | 0.64 |
| 2 | $\gamma$-$Al_2O_3$ | 0.90 | 0.30 | 0.55 |
| 2 | Microrutile | 0.68 | 0.25 | 0.52 |
| 2 | $SiO_2$ | 0.73 | 0.27 | 0.42 |

As can be seen from the table, regeneration gives good results both at different $RuO_2$ loadings and with different supports.

Example 16

Regeneration using a Mixture of 50% of $N_2$ and 50% of HCl 585 g of a fresh catalyst (2% of $RuO_2$ on $\alpha$-$Al_2O_3$) are operated at 380° C. using 195.0 standard $l \cdot h^{-1}$ of HCl and 97.5 standard $l \cdot h^{-1}$ of $O_2$. A conversion of the HCl of 74% is obtained. The gas flow is subsequently changed over to 150 standard l/h of $N_2$ and 20 standard l/h of $O_2$ and the catalyst is aged at 430° C. for 68 hours. In this state, the catalyst brings about an HCl conversion of 64% at 380° C. using 195.0 standard $l \cdot h^{-1}$ of HCl and 97.5 standard $l \cdot h^{-1}$ of $O_2$. The catalyst is then operated at 400° C. under 300 standard $l \cdot h^{-1}$ of a mixture of 50% of $N_2$ and 50% of HCl for 12 hours. After 12 hours, the temperature is adjusted to 400° C. and the catalyst is calcined under 300 standard l/h of air for 30 minutes. After this treatment, the catalyst displays an HCl conversion of 78% at 380° C. using 195.0 standard $l \cdot h^{-1}$ of HCl and 97.5 standard $l \cdot h^{-1}$ of $O_2$. Regeneration of the aged catalyst thus also gives good results when using mixtures of HCl and inerts.

The invention claimed is:

1. A process for the catalytic oxidation of hydrogen chloride, comprising
   i) introducing a stream comprising hydrogen chloride and an oxygen-comprising stream into an oxidation reactor comprising a hydrogen chloride oxidation catalyst comprising ruthenium oxide on a support material and oxidation of hydrogen chloride to chlorine over the catalyst until the catalyst has a reduced activity
   ii) regenerating the catalyst comprising
      a) reducing the catalyst in a gas stream consisting of hydrogen chloride and optionally an inert gas at a temperature of from 380 to 430° C., wherein the hourly gas throughput is from 0.1 to 1 kg of gas per kg of catalyst, b) recalcinating the catalyst in an oxygen-comprising gas stream at a temperature of from 330 to 450° C., wherein the hourly gas throughput is from 0.1 to 1 kg of gas per kg of catalyst, iii) continuing oxidizing hydrogen chloride to chlorine according to step i) over the regenerated catalyst obtained in ii);

and wherein i)-iii) are carried out in the same reactor.

2. The process according to claim 1, wherein the gas stream comprising hydrogen chloride comprises from 10 to 100% by volume of hydrogen chloride.

3. The process according to claim 2, wherein the gas stream comprising hydrogen chloride comprises nitrogen as inert gas.

4. The process according to claim 1, wherein the oxygen-comprising gas stream comprises from 1 to 100% by volume of oxygen.

5. The process according to claim 1, wherein the catalyst comprises ruthenium oxide on a support material selected from the group consisting of oxides of aluminum, silicon and titanium.

6. The process according to claim 5, wherein the support material is alpha-aluminum oxide.

7. The process according to claim 1, wherein the process is carried out in a fluidized-bed reactor.

8. A process for regenerating a hydrogen chloride oxidation catalyst comprising ruthenium oxide on a support material of alpha-alumina, said process comprises a) reducing the catalyst in a gas stream consisting of hydrogen chloride and optionally an inert gas at a temperature of from 380 to 430° C., wherein the hourly gas throughput is from 0.1 to 1 kg of gas per kg of catalyst, b) recalcinating the catalyst in a gas stream composed of oxygen and optionally an inert gas at a temperature of from 330 to 450° C., wherein the hourly gas throughput is from 0.1 to 1 kg of gas per kg of catalyst, wherein a) and b) are carried out in direct succession.

* * * * *